United States Patent [19]
Rath et al.

[11] 3,760,908
[45] Sept. 25, 1973

[54] DISC BRAKES FOR VEHICLES

[75] Inventors: Heinrich Bernhard Rath; Wolfgang Hess, both of Koblenz, Germany

[73] Assignee: Girling Limited, Birmingham, England

[22] Filed: Sept. 2, 1971

[21] Appl. No.: 177,892

[30] Foreign Application Priority Data
Sept. 4, 1970 Great Britain.................. 42,341/70

[52] U.S. Cl..................... 188/72.5, 92/84, 188/73.3
[51] Int. Cl........................................... F16d 55/228
[58] Field of Search............................ 287/20.3, 85; 188/72.4, 72.5, 72.6, 73.3, 73.5, 73.4, 73.6; 92/84

[56] References Cited
UNITED STATES PATENTS

| | | | |
|---|---|---|---|
| 3,651,898 | 3/1972 | Habgood........................ | 188/73.3 X |
| 3,525,420 | 8/1970 | Honick et al..................... | 188/72.4 |
| 3,534,989 | 10/1970 | Yonkers............................. | 287/20.3 |
| 2,390,168 | 12/1945 | Piof................................... | 287/85 |
| 3,625,314 | 12/1971 | Rinker.............................. | 188/73.3 X |
| 2,346,574 | 4/1944 | Guy................................... | 287/85 R |
| 3,447,820 | 6/1969 | Durnan............................. | 287/20.3 X |
| 3,616,879 | 11/1971 | Pauwels............................ | 188/73.3 X |

Primary Examiner—George E. A. Halvosa
Attorney—Scrivener, Parker, Scrivener & Clarke

[57] ABSTRACT

In a disc brake of the sliding yoke reaction type incorporating a yoke mounted for sliding movement relative to a stationary member and an hydraulic brake applying actuator, the actuator has an axial extension of reduced diameter which is received within a bush housed in an opening in the limb of the yoke upon which the actuator acts, and means are provided for engagement between the bush and the extension to prevent relative axial movement taking place between the actuator and the yoke.

1 Claim, 4 Drawing Figures

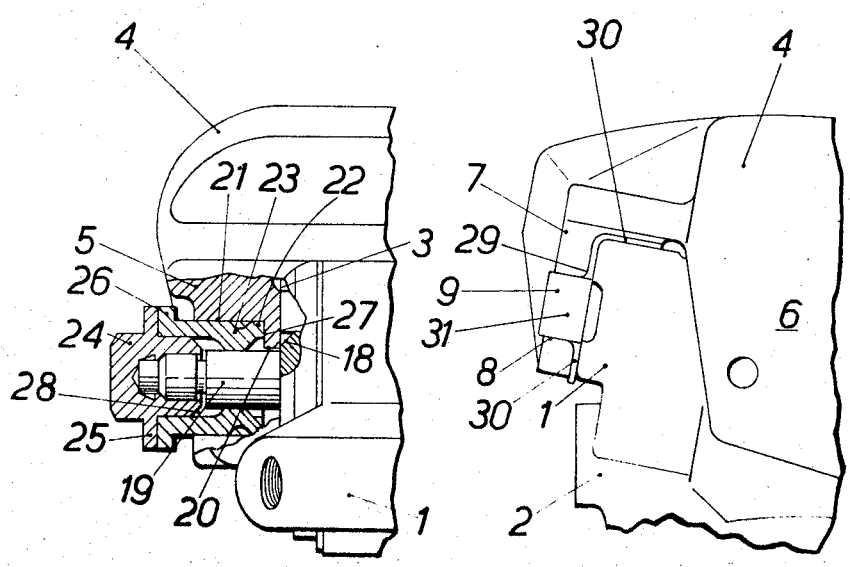
FIG.2
FIG.3
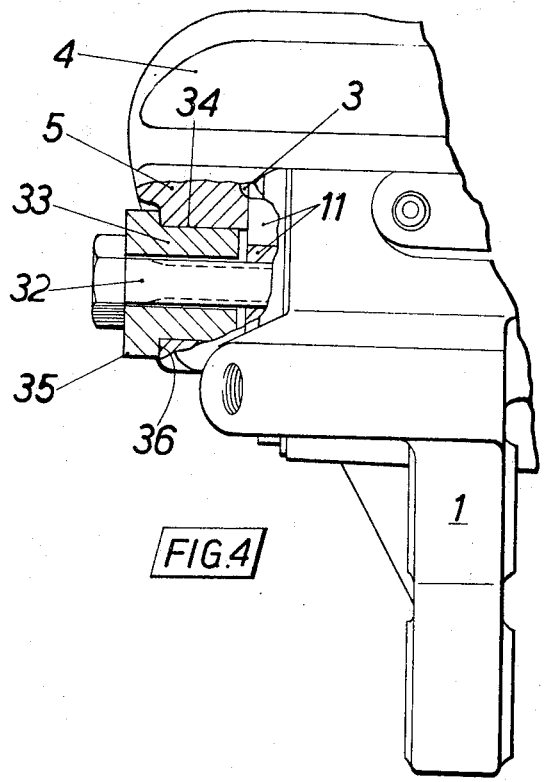
FIG.4

//3,760,908

DISC BRAKES FOR VEHICLES

SPECIFIC DESCRIPTION

This invention relates to improvements in disc brakes for vehicles of the kind in which an hydraulic actuator is adapted to apply a first friction pad assembly directly to an adjacent face of a rotatable disc, and the hydraulic actuator is adapted to apply a second friction pad assembly to the opposite face of the disc through a yoke which is mounted on or in a stationary member for sliding movement in a direction parallel to the axis of the disc.

According to our invention in a disc brake of the kind set forth the hydraulic actuator has an axial extension of reduced diameter which is received within a bush housed in an opening in the limb of the yoke upon which the actuator acts, and means are provided for engagement between the bush and the extension to prevent relative axial movement taking place between the actuator and the yoke.

Preferably the hydraulic actuator incorporates a first piston acting on the first friction pad assembly and a second piston acting on the yoke and movable in a direction opposite to that in which the first piston moves in the application of the brake, the axial extension being provided on the second piston.

Preferably, the bush is constructed from a plastics material which is deformable to compensate for tolerance variations between the opening in the limb and the extension.

In the application of the brake the drag on the directly actuated friction pad assembly is taken directly by the stationary member, and the drag on the indirectly actuated friction pad assembly is transmitted to the stationary member through the yoke.

The provision of the bush between the second piston and the yoke provides an additional support for the yoke. Furthermore, a proportion of the drag on the indirectly actuated friction pad assembly is transferred to a bore in the stationary member in which the second piston works and thus an additional guide surface for the yoke is provided.

Two embodiments of our invention are illustrated in the accompanying drawings in which:

FIG. 2 is a longitudinal section through a part of the brake shown in FIG. 1;

FIG. 3 is a view of a part of one end of the brake shown in FIGS. 1 and 2; and

FIG. 4 is a view similar to FIG. 2 but showing a modified construction.

Figure 1:
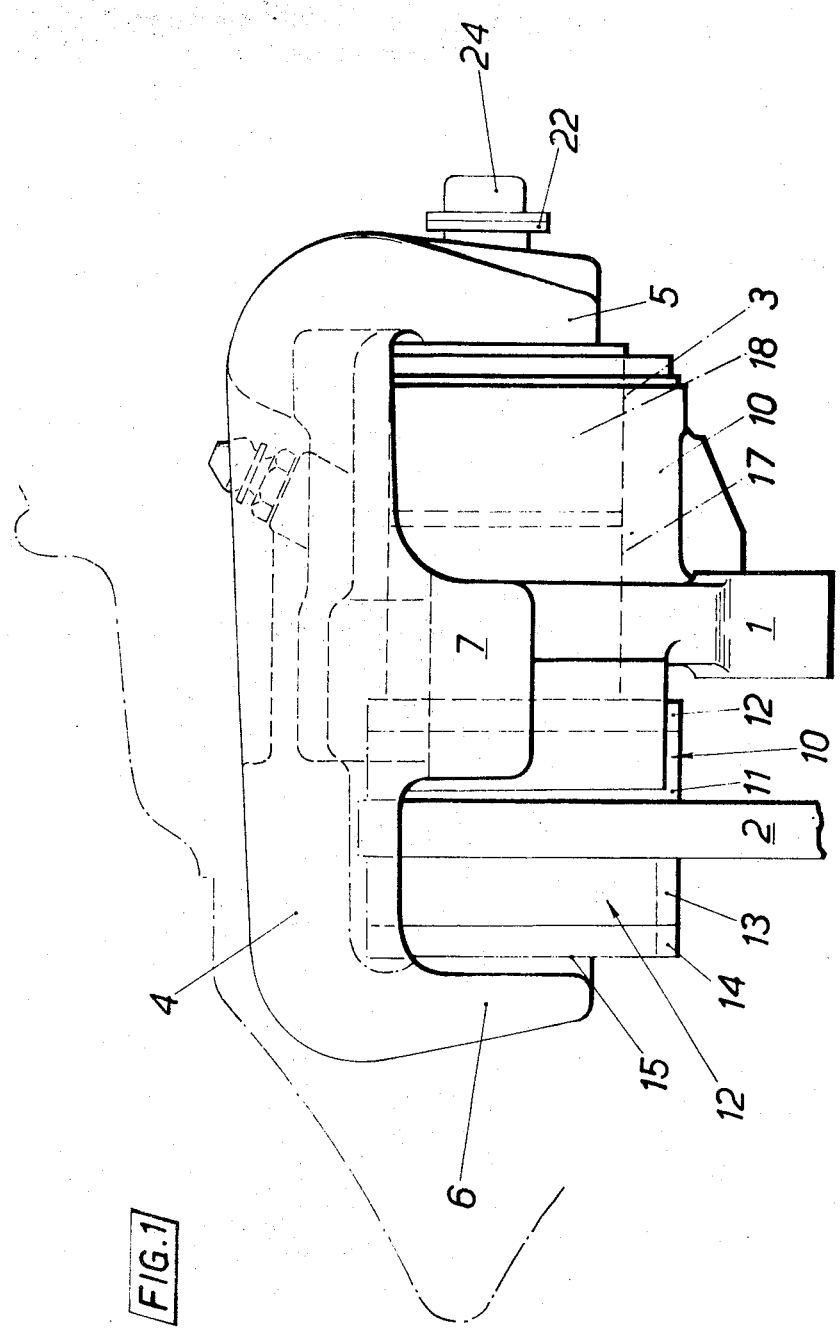
FIG. 1 is a side elevation of a brake incorporating our invention.

In the brake illustrated in FIGS. 1 – 3, a stationary member or carrier 1 is mounted on a stationary or non-rotating part on one side of a rotatable brake disc 2. The carrier 1, which is conveniently formed in a casting or forging, incorporates an hydraulic cylinder 3 of which the axis is substantially at right angles to the plane of the disc 2.

A yoke 4 is slidably mounted on the carrier 1 for movement in a direction parallel to the axis of the disc. Preferably the yoke 4 is formed as a casting or forging and has a central recess fitting over the carrier and a portion of the periphery of the disc 2. A pair of opposed inwardly projecting parallel limbs in the form of lugs 5 and 6 are provided at the axially opposite ends of the recess. A pair of inwardly projecting parallel lugs 7 provided at circumferentially spaced positions at opposite sides of the recess are provided at intermediate points in their radial depths with opposed notches 8, which receive circumferentially spaced ribs 9 on the ends of the carrier 1. Opposite radially innermost and outermost faces and the circumferentially outermost face of the notches 8 engage slidably with complementary faces on the ribs 9.

A first friction pad assembly 10 for engagement with one face of the disc 2, and comprising a friction pad 11 bonded or otherwise secured to a rigid backing plate 12, is guided for movement towards and away from the disc by the sliding engagement of end edges of the backing plate with complementary guiding surfaces in the carrier 1.

A second friction pad assembly 12 for engagement with the opposite face of the disc 2, and comprising a friction pad 13 bonded or otherwise secured to a rigid backing plate 14, is located in the recess in the yoke 4. The backing plate is engaged by a machined abutment surface 15 of the adjacent lug 6, to which it is spigotted or otherwise secured.

The first friction pad assembly 10 is applied directly to the disc 2, by a first piston 17 working in the hydraulic cylinder 3. A second piston 18, aligned with the first and working in the cylinder 3, is operative to urge the yoke 4 slidably with respect to the carrier 1 in an axial direction to bring the second friction pad assembly 12 into engagement with the opposite face of the disc when the pistons are separated by the application of hydraulic fluid under pressure to a space in the hydraulic cylinder 3 between adjacent ends of the pistons.

The outer end of the second piston 18 which engages with the lug 5 carries an axially extending integral spigot projection 19 of a diameter less than that of the piston 18.

The spigot 19 projects through an opening 20 in the lug 5 and through a counterbore 21 at the outer end of the opening 20. A bush in the form of a sleeve 22 of resilient plastics material is inserted in the annular space between the spigot 19 and the wall of the counterbore 21. The bush 22 engages with the wall of the counterbore 21 and is formed at an intermediate point in its length with an inwardly directed circumferentially extending radial rib 23 engaging with the spigot 19. The outer end of the piston 18 is held in abutment with the lug 5 by means of a flanged sleeve 24 which has a press fit onto the outer end of the spigot 19. The flanged sleeve 24 is provided with a radial flange 25 engaging with a complementary outwardly directed flange 26 on the outer end of the sleeve 22 to urge the inner end of the sleeve 22 into engagement with a shoulder 27 at the step in diameter between the opening 20 and the counterbore 21.

The plunged sleeve 24 is of an external diameter slightly greater than the internal diameter of the bush 22 so that, as the flanged sleeve 24 is pressed onto the spigot 19, the bush 22 is expanded to engage positively between the spigot 19 and the wall of the counterbore 21. Conveniently the expander portion of the flanged sleeve 24, located on the inner side of the flange 25, may be tapered in length at its free end which is of lesser diameter, as shown at 28.

The rib 23 is formed as a corrugation and the provision of the corrugation facilitates expansion of the bush 22 in radially opposed directions to eliminate relative movement between the spigot 19 and the counterbore 21 when the flanged sleeve 24 is pressed onto the spigot 19.

Means are provided for substantially eliminating noise and rattle between the yoke 4 and the carrier 1 and for improving the resistance to wear of the ribs 9 and the complementary faces of the notches 8 with which the ribs 9 engage slidably.

These means can take various forms. In the embodiment of disc brake illustrated in FIGS. 1 to 3 of the drawings these means comprise a resilient plate spring 29, which is constructed from brass or copper. The spring 29 is of generally cruciform outline having a first pair of opposed limbs 30 of substantial length and a second pair of opposed limbs 31 which are shorter in length than the limbs 30 and are disposed generally at right angles thereto. The plate spring 29 is inserted between the outermost end of each rib 9 on the carrier 1 and the base of the recess 8 in which that rib 9 is received. The limbs 30 are deformed over the radially uppermost and lowermost faces of the rib 9 so that the then uppermost limb 30 is disposed between that face of the rib 9 and the adjacent inner face of the yoke 4. The limbs 31 are cranked outwardly to straddle and engage with opposite ends of the yoke 4.

In the application of the brake the provision of the resilient sleeve 22 provides an additional support for the yoke and a proportion of the drag on the directly actuated or second friction pad assembly which is taken by the yoke is transferred through the sleeve 22, the spigot 19 and the second piston 18 to the bore 3 in the stationary carrier 1 in which the piston 18 works.

As the yoke 4 moves axially relative to the carrier 1, the springs 29 move with the yoke 4 and form anti-friction and anti-rattle devices between the yoke 4 and the carrier 1.

In the modified construction illustrated in FIG. 4 where corresponding reference numerals have been applied, where appropriate, to corresponding parts the spigot 19 is replaced by a bolt 32 which is screwed into a tapped hole in the outer end of the piston 18 through a bush 33 of resilient plastics material. The bush 33 is housed in an opening 34 in the lug 5 and is provided at its outer end with a radial flange 35 engaging with an annular region 36 of the outer face of the lug 5 which surrounds the opening 34.

When the bolt 32 is screwed into the piston 11 the bush 33 is compressed axially and expanded radially to clamp the wall of the bush 33 between the wall of the opening 34 and the shank of the bolt 32.

The construction and operation of the brake illustrated in FIG. 4 is otherwise the same as that described above with reference to FIGS. 1 – 3.

We claim:

1. In a disc brake for a vehicle comprising a rotatable disc having opposite faces, a stationary member for mounting on a stationary part adjacent to one face of said disc, a yoke mounted for sliding movement relative to said stationary member and extending over the peripheral edge of said disc, first and second axially spaced inwardly directed opposed limbs at opposite ends of said yoke, first and second friction pad assemblies for engagement with said opposite faces of said disc, an engagement between said second limb of said yoke and said second friction pad, an hydraulic actuator for applying said first friction pad assembly directly to an adjacent face of said disc, an engagement between said actuator and said first limb for moving said yoke axially with respect to said stationary member to apply said second friction pad assembly to the opposite face of said disc, the invention comprising a spigot projecting from said hydraulic actuator through a bore in said first limb and into a counter-bore in said first limb, a shoulder at a step in the diameter between said bore and said counter-bore, a bush housed in said counter-bore to receive said spigot and having an inner end and an outer end, a clamp member in the end of said spigot remote from said actuator urging said inner end of said bush against said shoulder, said clamp member including an expander portion extending into said outer end of said bush and of an external diameter slightly greater than the internal diameter of said bush to expand said bush radially, said bush and said clamp member being so constructed and arranged that said spigot and said first limb are clamped against relative movement in axial and radial directions.

* * * * *